United States Patent [19]
Shann

[11] Patent Number: 6,000,338
[45] Date of Patent: Dec. 14, 1999

[54] ELECTRICAL DISTRIBUTION SYSTEM

[75] Inventor: Peter Christian Shann, Fulford, United Kingdom

[73] Assignee: Hatorex AG, Geneva, Switzerland

[21] Appl. No.: 09/213,992

[22] Filed: Dec. 17, 1998

Related U.S. Application Data

[63] Continuation of application No. 08/836,219, filed as application No. PCT/GB95/02664, Nov. 14, 1995, abandoned.

[30] Foreign Application Priority Data

Nov. 18, 1994 [GB] United Kingdom .................. 9423314

[51] Int. Cl.[6] ....................................................... F23Q 7/02
[52] U.S. Cl. ............................ 102/217; 102/206; 361/249
[58] Field of Search ................................. 102/217, 218, 102/215, 206, 200; 361/249, 251

[56] References Cited

U.S. PATENT DOCUMENTS

| | | | |
|---|---|---|---|
| 3,851,589 | 12/1974 | Meyer ...................................... | 102/217 |
| 4,409,897 | 10/1983 | Kirby et al. .............................. | 102/217 |
| 4,674,047 | 6/1987 | Tyler et al. ............................... | 102/217 |
| 4,685,396 | 8/1987 | Birse et al. ............................... | 102/206 |
| 4,754,703 | 7/1988 | Kurokawa et al. ....................... | 102/200 |
| 4,848,232 | 7/1989 | Kurokawa et al. ....................... | 102/206 |
| 4,984,519 | 1/1991 | Ochi et al. ................................ | 102/217 |
| 4,986,183 | 1/1991 | Jacob et al. .............................. | 102/215 |
| 5,117,756 | 6/1992 | Goffin, II ................................. | 102/217 |
| 5,189,246 | 2/1993 | Marsh et al. ............................. | 102/217 |
| 5,295,438 | 3/1994 | Hill et al. ................................. | 102/217 |
| 5,520,114 | 5/1996 | Guimard et al. ......................... | 102/215 |

*Primary Examiner*—Charles T. Jordan
*Assistant Examiner*—Theresa M. Wesson
*Attorney, Agent, or Firm*—Madson & Metcalf

[57] ABSTRACT

The invention relates to an electrical distribution system for energizing a plurality of electric circuits in accordance with a predetermined delay pattern. The system as described comprises a control unit, a plurality of circuit delay arrangements each associated with an electrical circuit individual thereto and each circuit delay arrangement is identifiable by a circuit code individual thereto and includes a pulse counting arrangement. The control unit is arranged to transmit the circuit codes to the circuit delay arrangements and the pulse count individual to each circuit code, and each circuit delay arrangement identified by its circuit code is arranged to store the pulse count individual to that code. On receipt of a start signal from the control unit, transmitted simultaneously to all the circuit delay arrangements, each circuit delay arrangement starts its respective pulse counting arrangement and energizes its respective electrical circuit when the pulse count is completed.

19 Claims, 1 Drawing Sheet

ELECTRICAL DISTRIBUTION SYSTEM

This application is a continuation of a application, Ser. No. 08/836,219, May 6, 1997, now abandoned which is a 371 of PCT/GB95/02664 filed Nov. 14, 1995 which are hereby incorporated by reference.

This invention relates to electrical distribution systems and, more specifically, to an electrical distribution system for energizing a plurality of electrical circuits in accordance with a predetermined delay pattern.

BACKGROUND OF THE INVENTION

It is well known in the art to provide an electrical distribution system for energizing a plurality of electric circuits in accordance with a predetermined delay pattern and one such system comprises a conventional street lighting system, particularly a sodium light system, and wherein a plurality of electrical circuits, each associated with a lamp, are activated successively in accordance with a predetermined delay pattern so that the lights are illuminated in the predetermined delay sequence to avoid an overload of the local electrical distribution system. In such, a system the predetermined delay pattern is predetermined by a clock, the clock is set to actuate the light circuits in accordance with the predetermined delay program, and in such a system the actual delay between successive lights being illuminated is not important, subject to the lights being illuminated in the desired order.

The present invention is not concerned with such clock controlled electrical delay systems and such clock controlled systems are disclaimed herefrom.

In other electrical systems, for example electrical systems for igniting detonators in an explosives firing circuit in accordance with a predetermined pattern, there are factors which require that the detonators be ignited in accordance with a relatively accurate delay pattern.

One arrangement for obtaining an accurate time delay sequence for a plurality of circuits is disclosed in the British Patent Publication No 2015791B and wherein an accurate pulse generating means is provided in a control unit and a relatively cheap, and relatively inaccurate, pulse generating means is provided in each of the delay circuits associated with the respective loads. The accurate pulse generator in the control unit sends relatively accurate timing interval signals and each electrical load circuit includes means for receiving the timing interval signals from the control unit, means for allowing the pulse generator of each delay circuit to run for the time interval defined by the control unit and for counting the number of pulses made by the pulse generator during the time interval signals means. The delay circuits are arranged to calculate a further time interval as a function of the said time interval and, on receipt of a fire signal, each pulse generating means is then arranged to run for said time interval and said function of the time interval before activation the relevant electrical load circuit.

OBJECTS AND SUMMARY OF THE INVENTION

The object of present invention is to provide an electrical distribution system wherein individual circuit arrangements are operated in accordance with a predetermined delay pattern.

According to the present invention there is provided an electrical distribution system for energizing a plurality of electric circuits in accordance with a predetermined delay pattern, said system comprising a control unit and at least two circuit delay arrangements each associated with an electrical circuit individual thereto, characterized in that each of the circuit delay arrangements is identifiable by a circuit code individual thereto and includes a pulse counting arrangement, said control unit is arranged to transmit the circuit codes to the circuit delay arrangements and the pulse count individual to each circuit code, and each circuit delay arrangement identified by its circuit code is arranged to store the pulse count individual to that code whereby, on receipt of a start signal from the control unit transmitted simultaneously to all the circuit delay arrangements, each circuit delay arrangement starts its respective pulse counting arrangement and energizes its respective electrical circuit when the pulse count is completed.

Preferably the control circuit transmits the identification code for a specific circuit delay arrangement before transmitting the pulse count to be received and stored by the identified circuit delay arrangement.

Alternatively the control unit transmits a pulse count to be received and stored by a specific circuit delay arrangement to all the electric delay circuits, the identification code for a circuit delay arrangement is then transmitted to all the electric delay arrangements and when the code is received by the relevant delay circuit the pulse count is transmitted into said circuit delay arrangement and canceled from all the other circuit delay arrangements.

Thus, in a first embodiment, the arrangement is unique in that it allows the designer to select the accuracy of the pulse counting arrangement most suited for the accuracy required.

Further, the apparatus according to the present invention avoids all measurement of time intervals by the separate electrical delay circuits.

In one embodiment the pulse counting arrangement associated with each circuit delay arrangement is arranged to be controlled by a crystal individual to that circuit delay arrangement.

Crystals are well known in the art and are capable of affording a pulse counting accuracy which is acceptable for the delays necessary for most fuseheads.

In one embodiment the control unit includes an accurate pulse counting arrangement and each circuit delay arrangement transmits to the control unit a specimen of a pulse or pulses of its pulse counting arrangement, the control unit determines from the specimen of the pulse counting arrangement the number of pulses to be counted by that pulse counting device to achieve a predetermined delay and the control unit then transmits to each electrical load delay circuit the number of pulses to be counted by its respective pulse counting device when a start signal is applied to the circuit delay arrangement.

Preferably the control unit transmits a signal to each circuit delay arrangement, indicative of the number of pulses to be counted by the pulse counting arrangement of that circuit delay arrangement, as a coded signal.

Preferably each pulse counting arrangement comprises an oscillator.

In one preferred embodiment each circuit arrangement is electrically linked to the control unit and includes an electrical energy storage device, charged by signals transmitted to the storage device via the electrical link with the control unit, and each said storage device, when charged, has sufficient power to run its associated circuit delay arrangement and to initiate the electrical circuit after a start signal has been received.

Preferably the energy storage device comprises a capacitor.

In a preferred embodiment the electrical link between the control unit and each of said circuit delay arrangements comprises a ring and each of the circuit delay arrangement is electrically linked to the ring via a snap-on electromagnetic induction coupling.

In one embodiment in accordance with the invention the electrical distribution system comprises an electrical detonator circuit and wherein each circuit delay arrangement has at least one detonator associated therewith and arranged to fire when the pulse count of the circuit delay arrangement is completed.

BRIEF DESCRIPTION OF THE DRAWINGS

The invention will now be described further by way of example with reference to the accompanying drawings in which.

DETAILED DESCRIPTION OF THE PREFERRED EMBODIMENT

Figure 1:
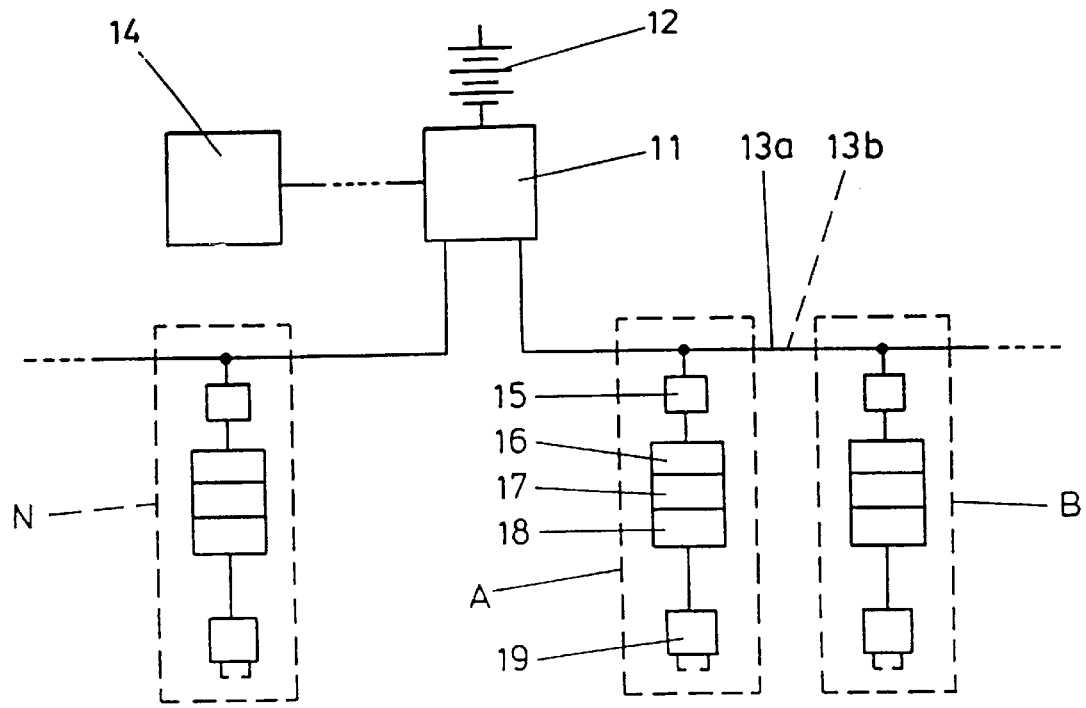
FIG. 1 shown, diagrammatically, a first electrical distribution system in accordance with the invention

In the embodiment illustrated in FIG. 1 a control unit 11, powered by a power supply 12, has attached thereto a ring line 13, conveniently a two-wire 13a and 13b ring line.

Each of a plurality of circuit delay arrangements A, B, - - - N, may be directly connected to the ring line 13, as indicated by the letter 'C', but in a preferred embodiment said circuit delay arrangements A, B, - - - N, are individually connected to the ring 13 via a snap-on electromagnetic device (S1) which allows the circuit delay arrangements A, B, - - - N, to be snapped onto the ring 13 at any desired location point along the length of the ring 13 and via which snap-on electro magnetic devices each circuit delay arrangement A, B, - - - N is physically and electrically connected to the ring 13.

The control unit 11 has an information unit 14 for use in association therewith and comprising an external unit 14, as shown in FIG. 1, which is preferably a hand-held unit able to store information from any desired number of circuit delay arrangements A, B, - - - N, and to transmit said information to the control unit 11.

Each of the circuit delay arrangements A, B, - - - N, includes an identification code individual thereto, stored in a memory 15, a pulse counter device 16, such as an oscillator, a capacitor 17, and a switching arrangement 18 adapted, when activated, to allow the capacitor 17 to discharge to an electrical load, in the illustrated example a fusehead 19.

As stated before the control unit 11 receives its information from an external memory 14, arranged to receive and store information for transfer to said unit 11 and, in practice, a shot firer or the like qualified person will attend at each circuit delay arrangement, A, B, - - - N, enter the code for the individual circuit delay arrangement into the hand-held unit 14 and thereafter enter the time delay for which the pulse counter of the circuit delay arrangement must run before activating the electrical load, such as detonator 19. The unit 14 on receiving the desired time delay for a specific circuit delay arrangement A, B, - - - N, will calculate the number of pulses to be counted by the device 16 to obtain the pre-set time interval. On return to the control unit 11 the hand-held unit 14 is plugged into the control unit 11, the information stored in the hand-held unit 14 is transferred to the control unit 11 and said unit 11 is then ready to communicate its contents to the individual circuit delay arrangements A, B, - - - N,.

In the operation of the above described arrangement, the oscillators 16 are selected to have pulse counts acceptable for the delay periods to be imparted to the circuit delay arrangement A, B, - - - N,.

When all the information relating to the circuit delay arrangements A, B, - - - N, has been supplied to the control unit 11, and transmitted therefrom to the individual circuit arrangements A, B, - - - N, and at the desired time, the control unit 11 is activated to apply a "fire" signal to all the individual code arrangements, the fire signal is arranged to by-pass all the identify code arrangements stored in the devices 15 so as to be applied simultaneously to all the electric delay circuits A,B, - - - N,. As the "fire" signal is applied simultaneously to all the circuit delay arrangements A, B, - - - N, on receipt of the fire signal, the pulse counter 16 of each circuit delay arrangements A, B, - - - N, start to count the number of pulses stored in the memories 15 of the respective delay arrangement A, B, - - - N,. As each pulse counter device 16 reaches its designated pulse count it closes the switching arrangement 18 to cause the associated capacitor 17 to discharge and whereby the discharge of the respective capacitor 17 activates the electrical load associated with the capacitor 17.

Figure 2:
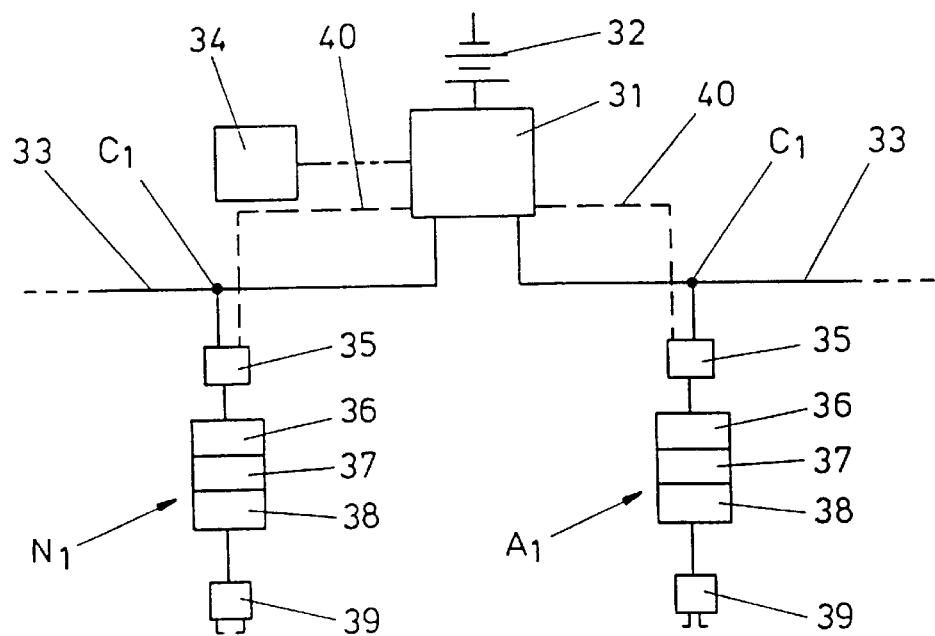
FIG. 2 shows, diagrammatically, a second electrical distribution system in accordance with the invention.

In the circuit arrangement illustrated in FIG. 2 a control unit 31 is arranged to communicate with a plurality of circuit delay arrangement A, B, - - - N, via a ring line 33, which is connected to each circuit delay arrangement A, B, - - - N, in similar manner to the manner described for FIG. 1.

In operation of the FIG. 2 embodiment the information unit 34 feeds to a memory store of the control unit 31 the code signals individual to each circuit delay arrangement A, B, - - - N and said code signals are stored in the said memory of the control unit 31. The information unit 34 also supplies to the control unit 31 the delay time predetermined for each circuit delay circuit A, B, - - - N, to run before activating its respective electrical load, for example a fusehead 39.

Information supplied to the control unit 31 by the hand-held device 34 is preferably entered into the device 34 by the person laying out the circuitry for the firing circuit feeding the information by hand to the hand-held device. Such information for each delay circuit will include a code identification, which is individual to each of the circuit delay arrangements A, B, - - - N, and the code identification will be followed by entry of the delay required for that circuit arrangement A, B, - - - N. The information is transmitted by the control unit 31 to the circuit delay arrangements, whereupon each circuit delay arrangement has its required delay time stored therein on a memory 35.

Whilst the control unit 31 is not sending signals to the individual circuit delay arrangements A, B, - - - N, said control unit 31 transmits signals along ring line 33 to cause a capacitor 37 in each circuit delay arrangement A, B, - - - N, to be charged.

When the control unit 31 has transmitted all the code signals and time delays stored therein to the respective circuit delay arrangement A, B, - - - N, each circuit delay arrangement A, B, - - - N, in turn, addresses its identification code and, then the time delay stored in its memory 35 and fixed for that circuit to the control unit 31. The control unit 31 receives such information via a line generally indicated by numeral 40, for illustration purposes only, and it will be appreciated that such information could readily be received via the line 33. A specimen of a pulse or a number of pulses, by the oscillator 36 in that delay circuit is also transmitted to the control unit 31. From the information received from each delay circuit A, B, - - - N,, and an extremely accurate pulse generating means, such as a crystal controlled device in the control unit 31, the control unit 31 examines the pulse or pulses supplied by the delay circuit A, B, - - - N, and calculates therefrom the number of pulses to be counted by the relevant oscillator 36 to achieve the delay time stored for that delay circuit A, B, - - - N,.

Once the control unit circuit has calculated the number of pulses to be counted by each of the oscillators 36 the control unit 31 addresses each delay circuit A, B, - - - N, by the identification code for each circuit and transmits to each addressed electric delay circuit the number of pulses to be counted by the oscillator 36 of that circuit.

When the control unit 31 has transmitted the pulse counts to be effective for each of the delay circuits A, B, - - - N, to all the respective delay circuits A, B, - - - N, the firing circuit is ready for firing and, on a command signal to fire from the control unit 31, the said fire signal by-passes all the identification code blockages, the fire signal immediately starts all the oscillators 36 and the delay circuits A, B, - - - N, will cause their respective capacitors 37 to be discharged after the pulse count for the specific delay circuit, to activate the detonator 39 associated with the delay circuit.

Thus, with this arrangement the control unit 31 calculates the number of pulses to be counted by each oscillator 36 before activating the respective capacitor 37 to fire the respective detonator 39.

It will he appreciated that the drawings simply illustrate the essential features required for the FIGS. 1 and 2 embodiments and the elements of the embodiments may be differently arranged, and the embodiments may include other elements and devices as desired to assist the practical applications of said embodiments.

What is claimed is:

1. An electrical distribution system for energizing a plurality of electric circuits in accordance with a predetermined delay pattern, said system comprising:

a control unity (31);

at least two circuit delay arrangements ($A_1$–$N_1$);

each circuit delay arrangement being associated with an associated electrical circuit, wherein each circuit delay arrangement ($A_1$–$N_1$) is identified by an associated circuit code and includes an associated pulse counting arrangement (36);

said control unit (31) is arranged to transmit each associated circuit code to each respective circuit delay arrangement ($A_1$–$N_1$);

said control unit (31) includes an accurate pulse counting arrangement;

said control unit (31) transmits to each said circuit delay arrangement ($A_1$–$N_1$) a number of pulses to be counted by said associated pulse counting arrangement (36) when a start signal is applied to said circuit delay arrangements ($A_1$–$N_1$);

each said circuit delay arrangement ($A_1$–$N_1$) is arranged to store a pulse count individual to said associated circuit code whereby, on receipt of said start signal from said control unit (31) transmitted simultaneously to said circuit delay arrangements ($A_1$–$N_1$) each said circuit delay arrangement ($A_1$–$N_1$) starts said associated pulse counting arrangement (36) and energizes said associated electrical circuit when said associated pulse count is equal to said number of pulses to be counted; and each said circuit delay arrangement ($A_1$–$N_1$) contacted by said associated circuit code is arranged to transmit to said control unit (31) a specimen of a predetermined number of pulses generated independently by said associated pulse counting arrangement (36), and said control unit (31) on receipt of each said specimen from said associated pulse counting arrangement (36) determines from said specimen said number of pulses to be counted by said associated pulse counting arrangement (36) to achieve a predetermined delay.

2. An electrical distribution system according to claim 1, wherein:

one of said circuit delay arrangements is a specific circuit delay arrangement;

said control unit (31) transmits a pulse count to be received and stored by said circuit delay arrangements ($A_1$–$N_1$); and said associated circuit code for said specific circuit delay arrangement ($A_1$–$N_1$) is transmitted to said circuit delay arrangements ($A_1$–$N_1$), and when said associated circuit code is received by said specific circuit delay arrangement; and said pulse count is transmitted into said specific circuit delay arrangement and canceled from all the other circuit delay arrangements ($A_1$–$N_1$).

3. An electrical, distribution system according to claim 1, wherein:

each said associated pulse counting arrangement (36) is arranged to be controlled by a crystal individual to said associated circuit delay arrangement (36).

4. An electrical distribution system according to claim 1 wherein:

said control unit (31) transmits a coded signal to said circuit delay arrangements ($A_1$–$N_1$);

said coded signal corresponding to a specific circuit delay arrangement; and said coded signal being indicative of said number of pulses to be counted by said associated pulse counting arrangement (36) of said specific circuit delay arrangement ($A_1$–$N_1$).

5. An electrical distribution system according to claim 1, wherein each associated pulse counting arrangement (36) comprises an oscillator.

6. An electrical distribution system according to claim 1, wherein:

each said circuit delay arrangement is electrically linked to the control unit (31) by an electrical link;

each said circuit delay arrangement includes an electrical energy storage device (37);

each said electrical energy storage device (37) being charged by signals transmitted to said electrical energy storage device via said electrical link with said control unit (31); and each said electrical energy storage device (37), when charged, has sufficient power to run said circuit delay arrangement ($A_1$–$N_1$);

each said electrical energy storage device initiates said associated electrical circuit after said start signal has been received.

7. An electrical distribution system according to claim 6, wherein each said electrical energy storage device (37) comprises a capacitor.

8. An electrical distribution system according to claim 6, wherein:

each said electrical link between said control unit (31) and each said circuit delay arrangement ($A_1$–$N_1$) comprises a ring; and each said circuit delay arrangement is electrically linked to said ring via a snap-on electromagnetic induction device.

9. An electrical detonator circuit comprising an electrical distribution system according to claim 1, wherein:

each said circuit delay arrangement ($A_1$–$N_1$) has at least one detonator (39) associated therewith and arranged to fire when said pulse count of said circuit delay arrangement ($A_1$–$N_1$) equals said number of pulses to be counted.

10. A method for energizing a plurality of electric circuits in accordance with a predetermined delay pattern, each electric circuit associated with a delay circuit, comprising the steps of:

identifying each delay circuit with an associated circuit code;

transmitting from a control unit the associated circuit code to each respective delay circuit;

each delay circuit transmitting to the control unit a specimen of a predetermined number of pulses generated independently by the delay circuit;

the control unit, upon receipt of the specimens, determining the number of pulses to be counted by each associated delay circuit;

Transmitting from the control unit a pulse count specific to each delay circuit and storing the pulse count in the respective delay circuit;

transmitting from the control unit a start signal simultaneously to each delay circuit; and each delay circuit counting the number of pulses provided by its respective pulse count upon receipt of a start signal and energizing the associated electrical circuit when its respective pulse count equals the number of counted pulses.

11. The method of claim 10 wherein each delay circuit comprises an associated pulse counting arrangement effective to count a number of pulses.

12. The method of claim 11 wherein the associated pulse counting arrangement comprises a crystal.

13. The method of claim 11 wherein the associated pulse counting arrangement comprises an oscillator.

14. The method of claim 10 further comprising the steps of:

transmitting a specific pulse count simultaneously to each delay circuit;

transmitting a circuit code specific to one associated delay circuit;

retaining the circuit code within the one associated delay circuit; and canceling the specific pulse count from all other delay circuits.

15. The method of claim 10 further comprising the step of the control unit transmitting a coded signal to each delay circuit, wherein the coded signal corresponds to a specific delay circuit, and wherein the coded signal is indicative of the number of pulses to be counted by the specific delay circuit.

16. The method of claim 10 wherein each delay circuit is in electrical communication with the control unit by an electrical link, wherein each delay circuit comprises an electrical energy storage device, and further comprising the steps of:

charging the electrical energy storage device by signals transmitted to the electrical energy storage device from the control unit such that the electrical energy storage device has sufficient power to run the delay circuit; and the electrical energy storage device initiating an associated electrical circuit after receipt of a start signal.

17. The method of claim 16 wherein the electrical energy storage device comprises a capacitor.

18. The method of claim 16 wherein the electrical link comprises a ring, and wherein each delay circuit is electrically linked to the ring via a snap-on magnetic induction device.

19. The method of claim 10 wherein each delay circuit comprises an associated detonator, wherein the detonator is configured to fire upon energizing of the associated electrical circuit.

* * * * *